United States Patent [19]

Sekiya et al.

[11] Patent Number: 4,774,598
[45] Date of Patent: Sep. 27, 1988

[54] SLOW-MOTION DEVICE OF MAGNETIC RECORDING AND REPRODUCING APPARATUS

[75] Inventors: Masataka Sekiya, Mito; Hideo Nishijima, Katsuta; Kaneyuki Okamoto, Katsuta; Eiichi Funaki, Mito; Isao Fukushima, Katsuta, all of Japan

[73] Assignee: Hitachi, Ltd., Tokyo, Japan

[21] Appl. No.: 857,235

[22] Filed: Apr. 29, 1986

[30] Foreign Application Priority Data

Apr. 30, 1985 [JP] Japan ................... 60-91094

[51] Int. Cl.[4] .............................. H04N 5/78
[52] U.S. Cl. ................... 360/10.2; 360/10.3
[58] Field of Search .............. 360/10.2, 10.3

[56] References Cited

U.S. PATENT DOCUMENTS 4,280,146 7/1981 Misati et al. ................ 360/10.2
4,306,255 12/1981 Misati et al. ................ 360/10.3
4,403,260 9/1983 Kawamura et al. ........... 360/10.2

FOREIGN PATENT DOCUMENTS 0116646 8/1984 European Pat. Off. .
54-2018 1/1979 Japan .
58-123283 7/1983 Japan .................... 360/10.3
58-212274 12/1983 Japan .................... 360/10.3

Primary Examiner—Aristotelis M. Psitos
Attorney, Agent, or Firm—Antonelli, Terry & Wands

[57] ABSTRACT

In a slow-motion device of a helical scan type video tape recorder, detection is effected to detect a noise in a reproduced signal which is caused when the magnetic tape is fed such that the magnetic heads which have reproduced a preceding still image at a track transfer to the succeeding track and thereafter the magnetic heads scan the succeeding track, and the position of the magnetic tape is controlled by a tape control system so that the noise is confined within a position at a noise bar due to the noise is prevented from being displayed on the reproduction screen.

1 Claim, 4 Drawing Sheets

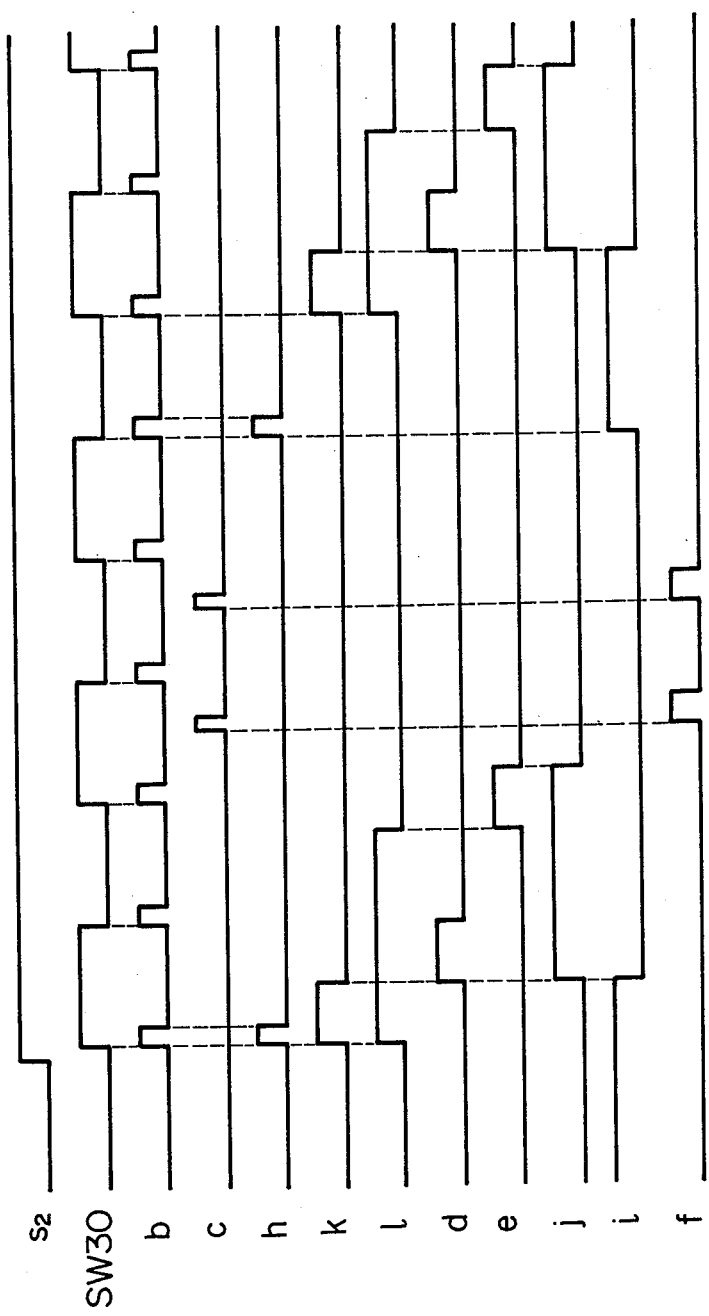

SLOW-MOTION DEVICE OF MAGNETIC RECORDING AND REPRODUCING APPARATUS

BACKGROUND OF THE INVENTION

1. Field of the Invention

This invention relates to a slow-motion device of a magnetic recording and reproducing apparatus which performs slow-motion reproduction by feeding a magnetic tape intermittently.

2. Description of the Prior Art

In the past, various types of slow-motion reproduction schemes adapted for a magnetic recording and reproducing apparatus of helical scan type (hereinafter referred to as a VTR) have been proposed. In one known scheme, a magnetic tape is intermittently fed at intervals of one track or one pitch between tracks of the same azimuth, and still image reproduction is effected at every track to accomplish slow-motion reproduction.

In this known slow-motion reproduction scheme, however, it is general practice to feed the magnetic tape intermittently by using control signal information recorded on the same magnetic tape. More specifically, when still image reproduction at a track ends, the magnetic tape is driven until it stops at the time that the video head is placed in condition for scanning the succeeding track for reproduction thereat. And, the stoppage of the magnetic tape is effected by using a control signal reproduced from the information.

In general, however, individual VTRs suffer from slight irregularity in accuracies of fitting parts and consequently, the recording position of the control signal information with respect to tracks recording a video signal slightly differs from one VTR to another. Therefore, if the slow-motion reproduction is effected with the same VTR as that used for recording, no significant problem will arise but if effected with a VTR using a magnetic tape which is recorded by another VTR, there is a possibility that the magnetic tape is stopped with the video head incorrectly placed for scanning. Specifically, in the slow-motion reproduction wherein the video head is obliquely scanned along the track, it is necessary that a scanning error take place at the end of the track in order to prevent a noise bar due to the scanning error from being displayed on the reproduction screen and that the video head correctly scan the track at the central portion thereof. However, the aforementioned difference in the recording position of the control signal information leads to scanning errors which take place at portions of the track other than its end, resulting in a noise bar displayed on the reproduction screen.

A technical expedient for elimination of such problems has been known wherein a variable delay means such as a monostable multivibrator with a variable time constant is used to variably delay the control signal so as to artificially vary the recording position of the control signal information and the amount of delay of the control signal is adjusted by means of an adjusting means, while viewing the reproduction screen, such that any noise bar can be eliminated from the reproduction screen.

However, the adjusting means is operated by the user, who is disadvantageously forced to participate in very troublesome work. Moreover, the provision of the adjusting means in a VTR results in complexity of the construction and expensiveness of the VTR.

SUMMARY OF THE INVENTION

The present invention contemplates elimination of the prior art drawbacks and has for its object to provide a slow-motion device of a VTR which can use magnetic tapes recorded by other VTRs than its own VTR without relying upon adjustments to obtain a slow-motion picture devoid of any noise bar.

To accomplish the above object, according to the invention, detection is effected to detect a noise in a reproduced signal which is caused when the magnetic tape is fed such that the magnetic heads which have reproduced a preceding still image at a first track transfer to the second succeeding track and thereafter the magnetic heads scan the second track, and the position of the magnetic tape is controlled by a tape control system so that the noise is confined within a position at which a noise bar due to the noise is prevented from being displayed on the reproduction screen.

Thus, the present invention can dispense with the adjusting means adapted to eliminate the noise bar from the reproduction screen and can omit adjustments to this end otherwise required for individual magnetic tapes, to ensure that the VTR can be simplified in its construction, reduced in its cost and improved in easiness of operation, thereby providing a highly functional slow-motion device of VTR freed from the prior art disadvantages.

BRIEF DESCRIPTION OF THE DRAWINGS

FIG. 6 is a waveform diagram showing signals which are useful to explain the overall operation of the FIG. 4 circuit.

DESCRIPTION OF THE PREFERRED EMBODIMENT

The invention will now be described by way of example with reference to the accompanying drawings.

Figure 1:
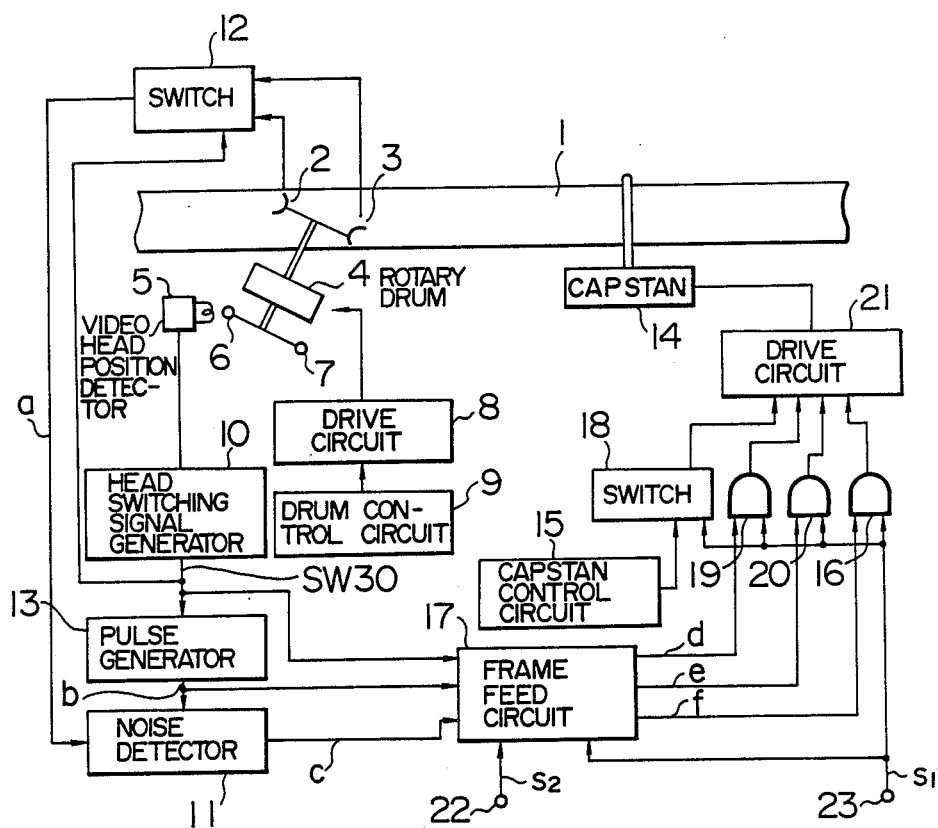
FIG. 1 is a block diagram showing a slow-motion device of a VTR according to an embodiment of the invention.

As schematically shown in block form in FIG. 1, a slow-motion device of VTR according to a preferred embodiment of the invention comprises a magnetic tape 1, video heads 2 and 3, a rotary drum 4, a video head position detector 5, magnets 6 and 7, a drive circuit 8, a drum control circuit 9, a head switching signal generator 10, a noise detector 11, a switch 12, a pulse generator 13, a capstan 14, a capstan control circuit 15, an AND gate 16, a frame feed circuit 17, a switch 18, AND gates 19 and 20, a drive circuit 21, and input terminals 22 and 23.

The operation of this embodiment will be described.

Firstly, in a normal reproduction mode, the rotary drum 4 and the capstan 14 are respectively controlled for continuous rotation by the drum control circuit 9 through the drive circuit 8 and by the capstan control circuit 15 through the drive circuit 21. The video heads 2 and 3 rotate along with the rotary drum 4 to reproduce information recorded on the magnetic tape 1 in an alternate fashion. The magnets 6 and 7 are so located as to represent mount positions of the video heads 2 and 3, respectively, and cooperate with the video head position detector 5 to induce pulse signals. In response to the pulse signals, the head switching signal generator 10 generates a head switching signal (hereinafter termed SW 30) applied to the switch 12. In accordance with the SW 30, the switch 12 synthesizes reproduction signals from the video heads 2 and 3 to provide a single continuous signal a (hereinafter referred to as an envelope signal). The noise detector 11 receives the envelope signal a and detects a decrease in level thereof to produce a pulse signal c representative of a decreased level portion. The noise detector 11 also receives a pulse signal b from the pulse generator 13 and it is inhibited from producing the pulse signal c when the decreased level portion of the envelope signal a is confined within a duration period of a pulse in the pulse signal b. This pulse duration period corresponds to a duration period in which any picture is not displayed on the monitor screen (namely, a duration period within the vertical blanking period). Accordingly, when the decreased level portion of the envelope signal a lies within the duration period of the pulse signal b, any noise bar due to the decreased level portion will not be displayed on the reproduction screen. The pulse signal b is formed from the SW 30 delivered out of the head switching signal generator 10.

On the other hand, a normal reproduction/still image reproduction switching signal (hereinafter referred to as a reproduction mode switching signal) $S_1$ fed from the input terminal 23 and a slow-motion reproduction command signal (hereinafter referred to as a slow command signal) $S_2$ fed from the input terminal 22 both assume a low level "L" during the normal reproduction mode, so that the capstan control circuit 15 is permitted to connect to the drive circuit 21 through the switch 18 so as to control the capstan 14, the frame feed circuit 17 is placed in a disabled condition, and the AND gates 16, 19 and 20 are disabled.

Subsequently, when the user inputs an instruction for still image reproduction, the reproduction mode switching signal $S_1$ from the input terminal 23 is inverted from "L" to "H" (high level) to thereby turn off the switch 18, make the AND gates 16, 19 and 20 ready for enabling and enable the frame feed circuit 17 to start operating, the frame feed circuit 17 having been initialized with the reproduction mode switching signal $S_1$ being "L".

If a noise bar is displayed on the reproduction screen when the reproduction mode switching signal $S_1$ changes from "L" to "H", a decreased level portion of envelope signal a corresponding to this noise bar is outside the duration period of a pulse in the pulse signal b. Accordingly, the noise detector 11 produces a pulse signal c having a pulse corresponding to the decreased level portion. This pulse signal c activates the frame feed circuit 17, causing the same to produce a low speed drive signal f which drives the capstan 14 at a low speed to make the magnetic tape 1 travel slowly. This operation continues until the decreased level portion of envelope signal a is forced to lie within the duration period of the pulse signal b.

In contrast, if the decreased level portion of envelope signal a lies within the duration period of the pulse signal b upon the inversion of the reproduction mode switching signal $S_1$ from "L" to "H", no noise bar is displayed on the reproduction screen and the frame feed circuit 17 will not be activated, thereby keeping the magnetic tape 1 stopped.

In this manner, following transfer from the normal reproduction mode to the still image reproduction mode, still image reproduction devoid of noise bar can be achieved.

In a slow-motion reproduction mode, the magnetic tape is fed at the rate of frame in order that a still image can be reproduced at each of the successive tracks. Therefore, in describing the slow-motion reproduction operation, the frame feed operation will be explained wherein reproduction of a still image at a track transfers to reproduction of another still image at the succeeding track.

Since a track pattern recorded on the magnetic tape 1 is determined under the standard, it can theoretically be estimated from a still image devoid of noise bar (noiseless still image) being presently reproduced how much the magnetic tape should be moved for the purpose of reproducing another noiseless still image at the succeeding track. Thus, the magnetic tape 1 is accelerated and decelerated to travel by one pitch of frame which measures when recording, that is, intermittently fed to ensure that a noiseless still image can be reproduced at the succeeding track. In this case, noiseless frame feed can be obtained by initiating the intermittent feed in timed relationship with specified positions of scanning of the video heads 2 and 3 which are stipulated during the intermittent feed. From this point of view, the timing for initiation of the intermittent feed is set by a signal representative of positions of the video head 2 and 3, that is, the SW 30.

More particularly, when the slow-motion reproduction command signal $S_2$ is inverted from "L" to "H" in accordance with the slow-motion instruction inputted by the user, the frame feed circuit 17 responds to the SW 30 delivered out of the head switching signal generator 10 to produce a pulse signal d for accelerating the capstan 14 (hereinafter referred to as an acceleration pulse signal) and a pulse signal e for braking the capstan (hereinafter referred to as a brake pulse signal) which in turn are supplied to the drive circuit 21 through the AND gates 19 and 20. As a result, the magnetic tape 1 is fed intermittently. This intermittent feed of the magnetic tape 1 is sequentially effected while the slow-motion command signal $S_2$ remains "H", so as to perform the slow-motion reproduction operation.

In performing the noiseless slow-motion reproduction in this manner, when there occur disturbances of tape tension and recording pattern in the magnetic tape 1, the noise bar can not be eliminated completely and remains slightly as viewed in terms of unit of frame feed after completion of the frame feed. In such an event, the noise detector 11 detects a noise from the envelope signal a and produces the pulse signal c with the result that the frame feed circuit 17 is activated by the pulse signal c. The low speed drive signal f is then delivered out of the frame feed circuit 17 and supplied to the drive circuit 21 through the AND gate 16 so as to drive the capstan 14 at a low speed. When the noise detector 11 does not any more send the pulse signal c, the frame feed circuit 17 stops delivering the low speed drive signal f and consequently the capstan 14 stops. In this manner, the noise bar disappears from the reproduction screen. Thereafter, the frame feed circuit 17 again produces the acceleration pulse signal d and the brake pulse signal e so that the magnetic tape 1 can be fed intermittently. The above operations are repeated to perform the slow-motion reproduction.

Figure 2:
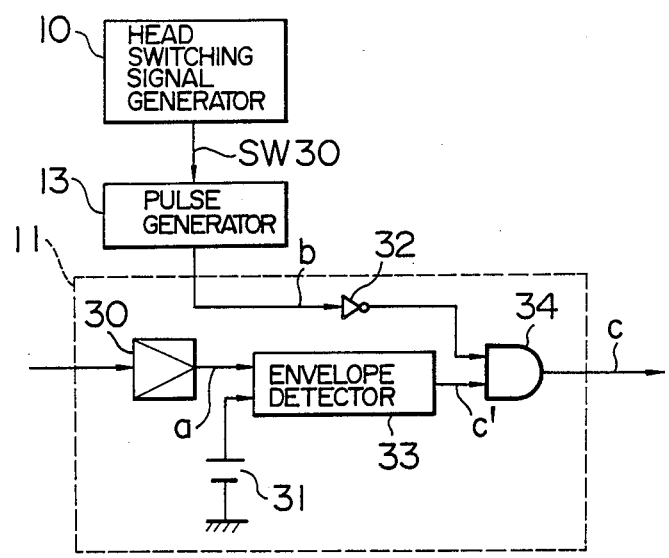
FIG. 2 is a block diagram showing an example of a noise detector used in the device of FIG. 1.
Figure 3:
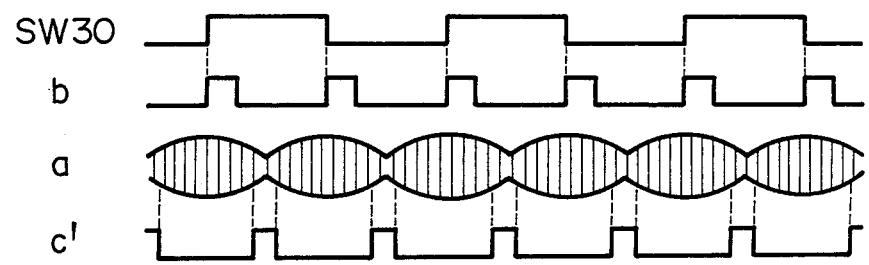
FIG. 3 is a waveform diagram showing signals appearing in the circuit of FIG. 2.

As exemplarily detailed in block form in FIG. 2, the noise detector 11 of FIG. 1 comprises an amplifier 30, a reference voltage source 31, an inverter 32, an envelope detector 33 and an AND gate 34. Components corresponding to those of FIG. 1 are designated by the same reference numerals. Signals indicated in FIG. 2 have waveforms as illustrated in FIG. 3.

The operation of the FIG. 2 circuit will be described with reference to FIG. 3. The head switching signal generator 10 sends the SW 30. This SW 30 is for synthesizing the output signals from the video heads 2 and 3 into the single continuous signal and formed so as to cause the switch 12 (FIG. 1) to switch over in synchronism with the occurrence of an image portion which is not displayed on the reproduction screen (namely, the vertical blanking period). Thus, on the basis of the SW 30, the pulse generator 30 generates the pulse signal b during the time period over which no picture is displayed on the reproduction screen.

The envelope signal a is amplified at the amplifier 30 and compared at the envelope detector 33 with the reference voltage. Decreased level portions of the envelope signal a form a pulse signal c' which is delivered out of the envelope detector 33. The pulse signal b is inverted at the inverter 32 and ANDed with the pulse signal c' at the AND gate 34. The pulse signal c delivered out of the AND gate 34 contains "H" pulses which represent the time period over which the noise bar is displayed on the reproduction screen.

Figure 4:
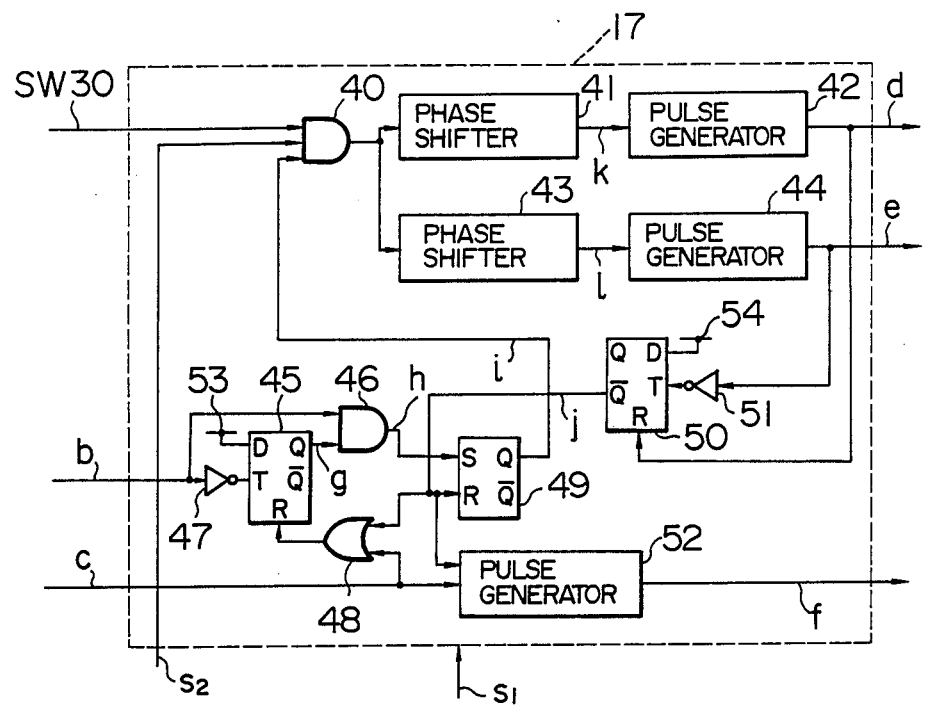
FIG. 4 is a block diagram showing an example of a frame feed circuit used in the device of FIG. 1.

As exemplarily detailed in block form in FIG. 4, the frame feed circuit 17 of FIG. 1 comprises an AND gate 40, a phase shifter 41, a pulse generator 42, a phase shifter 43, a pulse generator 44, a D flip-flop 45, an AND gate 46, an inverter 47, an OR gate 48, an RS flip-flop 49, a D flip-flop 50, an inverter 51, a pulse generator 52, and a power supply, as designated by reference numerals 53 and 54, for supply of "H" level Vcc.

Figure 5:
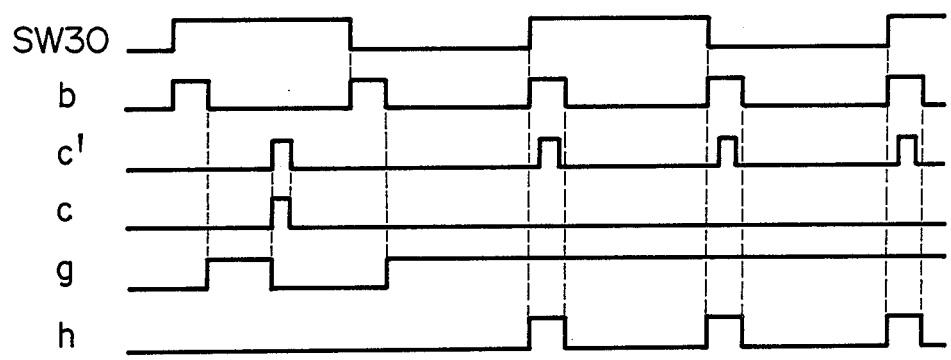
FIG. 5 is a waveform diagram showing signals appearing in a detector portion for the presence or absence of noise bar in the circuit of FIG. 4.

With reference to FIG. 5 showing signal waveforms, the operation of components around the D flip-flop 45 in FIG. 4 will first be described.

Assume that the D flip-flop 45 is initialized by the reproduction mode switching signal $S_1$ such that its Q output bearing a voltage signal g is set to be at "L" level, the Q output (voltage signal i) of the RS flip-flop 49 is set to be at "H" level, and the Q output (voltage signal j) of the D flip-flop 50 is set to be at "L" level. Furthermore, when the reproduction mode switching signal $S_1$ is inverted from "L" level to "H" level, each initialization is removed, and an input signal can be accepted. In addition, it will be seen from the foregoing description that the SW 30 and pulse signals b, c', and c are related to each other as diagrammatically shown in FIG. 5.

The pulse signal c is supplied to the pulse generator 52, and when the voltage signal j is "L" level, a pulse signal f is generated. When the reproduction mode switching signal $S_1$ is inverted from "L" level to "H" level, the pulse signal f is passed through the AND gate 16 shown in FIG. 1. Accordingly, the magnetic tape 1 is run at a low speed by the drive circuit 21 and the capstan 14, and when the input of the pulse signal c stops, the low-speed running is stopped at once.

The D flip-flop 45 having its D input supplied with "H" level from the power supply 53 and its T input to receive an inverted pulse signal of the pulse signal b fed from the inverter 47 produces the voltage signal g which is inverted from "L" to "H" by the fall of the pulse signal b. The pulse signal c is supplied as a reset signal to the D flip-flop 45 through the OR gate 48 and under the application of pulse signal c, the D flip-flop 45 is therefore reset by the rise of the pulse signal c to produce the output voltage signal g which is inverted from "H" to "L". In the absence of the pulse signal c applied, however, the voltage signal g once changed to "H" by the pulse signal b is fixed at the "H" level and ANDed with the pulse signal b at the AND gate 46, thereby producing a pulse signal h. Accordingly, the production of pulse signal h from the AND gate 46 means that the pulse signal c is not supplied to the frame feed circuit 17 and that no noise bar is being displayed on the reproduction screen.

Next, the overall operation of the specified circuit of FIG. 4 will be described with reference to signal waveforms shown in FIG. 6.

Upon transfer of the normal reproduction mode to the still image reproduction mode, the still image reproduction becomes noiseless through the operation described above. Under this condition, when the slow-motion instruction is issued from the user, the slow-motion reproduction command signal $S_2$ is inverted from "L" to "H". Until then, the output voltage signal g of the D flip-flop 45 has been initialized at "L", the Q output (voltage signal i) of the RS flip-flop 49 at "H", and the $\overline{Q}$ output (signal voltage j) at "L".

With the slow-motion reproduction command signal $S_2$ inverted from "L" to "H", the AND gate 40 is enabled to pass the SW 30 because the voltage signal i of the RS flip-flop 49 is "H". The SW 30 is applied to the phase shifters 41 and 43, which generate voltage signals k and l at "H" level. Although in the illustration of FIG. 6 the phase shifters 41 and 43 are activated by the rise of the SW 30, they may also be operated by the fall thereof. The pulse generator 42 is started to operate by the fall of the voltage signal k so as to generate the acceleration pulse d. As explained with reference to FIG. 1, the acceleration pulse d is applied through the AND gate 19 to the drive circuit 21 which in turn accelerates the capstan 14. On the other hand, the pulse generator 44 is started to operate by the fall of the voltage signal l so as to generate the brake pulse signal e. This brake pulse signal e, as explained with reference to FIG. 1, is applied through the AND gate 20 to the drive circuit 21 which in turn brakes the capstan 14. By the above action of the capstan, the magnetic tape 1 is fed intermittently by a predetermined track pitch.

The acceleration signal d is also applied as a reset signal to the D flip-flop 50. By the rise of this reset signal, the D flip-flop 50 is reset to invert the voltage signal j from "L" to "H". This voltage signal j also acts as a reset signal which is directly fed to the RS flip-flop 49 (to invert its output Q to "L") and is fed through the OR gate 48 to the D flip-flop 45 (causing its Q output voltage signal g to invert to "L"). The voltage signal j at "H" level is also applied to the pulse generator 52 to inhibit the operation of the pulse generator 52 during the duration period of the voltage signal j.

Consequently, the voltage signal i of the RS flip-flop 49, inverted to "L" by the acceleration pulse d delivered out of the pulse generator 42, disables the AND gate 40. At the same time, the magnetic tape 1 (FIG. 1) accelerated by the acceleration signal d causes the video heads 2 and 3 (FIG. 1) to undergo a tracking error, with the result that the noise detector 11 (FIG. 1) is operated to produce the pulse signal c. Under the occurrence of the pulse signal c, the D flip-flop 45 triggered by the fall of the pulse signal b as explained with reference to FIG. 4 will immediately be reset by this pulse signal c. Consequently, the AND gate 46 is kept disabled and hence the RS flip-flop 49 is not set to maintain its output voltage signal i at "L" level. It therefore follows that the AND gate 40 disabled at the time of the occurrence of the acceleration pulse signal d continues to maintain its OFF state and to block the SW 30.

Following the generation of acceleration pulse signal d by the pulse generator 42, the brake pulse signal e is generated by the pulse generator 44. As described previously, this brake pulse signal e brakes the capstan 14 (FIG. 1) to stop the magnetic tape 1. At this time, the video heads 2 and 3 are located above a track for the succeeding still image reproduction.

This brake pulse signal e is also applied to the T terminal of the D flip-flop 50 through the inverter 51. The fall of the brake pulse signal e changes the "H" voltage signal j delivered and of the D flip-flop 50 to "L". This "L" voltage signal j releases the D flip-flop 45 and RS flip-flop 49 from resetting and the pulse generator 52 from inhibition.

When under this condition any noise bar which would otherwise be displayed on the reproduction screen causes the noise detector 11 (FIG. 1) to produce the pulse signal c, the pulse generator 52 receiving this pulse signal c is triggered to generate the low speed drive signal f which in turn is supplied through the AND gate 16 to the drive circuit 21 as explained previously, thereby driving the magnetic tape 1 at a low speed until the noise detector 11 stops producing the pulse signal c. With the magnetic tape 1 stopped, the noiseless still image reproduction is carried out.

In the absence of the pulse signal c supplied to the frame feed circuit 17, the voltage signal g from the D flip-flop 45 is fixed to "H" level after the D flip-flop 45 has once been set by the pulse signal b and hence the AND gate 46 is kept ready for enabling. Accordingly, upon occurrence of a pulse of the pulse signal b, the AND gate 46 is enabled to produce the pulse signal h which in turn sets the RS flip-flop 49 such that it produces the "H" voltage signal i. This "H" voltage signal i keeps the AND gate 40 ready for enabling, so that the succeeding SW 30 is supplied to the phase shifters 41 and 43 through the AND gate 40, followed by the generation of the acceleration pulse signal d and the brake pulse signal e.

In this manner, as far as the slow-motion reproduction command signal $S_2$ remains at "H" level, the generation of acceleration pulse signal d, brake pulse signal e and low speed drive signal f is sequentially repeated to allow the frame feed operation of the magnetic tape 1 to continue for carrying out the slow-motion reproduction. If in this procedure the acceleration pulse signal d and the brake pulse signal e succeed in placing the video heads 2 and 3 above the succeeding track without tracking errors to thereby prevent the noise bar from being displayed on the reproduction screen, then the noise detector 11 will not produce the pulse signal c and the pulse generator 52 will not therefore generate the low speed drive signal f.

As described above, according to this embodiment, the noiseless slow-motion reproduction can be performed with any magnetic tapes without resort to any adjustment by the user.

What is claimed is:

1. A slow-motion device for a magnetic recording and reproducing apparatus capable of sequentially recording and reproducing video information at predetermined intervals in an oblique direction of a magnetic tape by a rotary head, comprising:
   driving means for driving said magnetic tape;
   means for generating a pulse signal synchronous with a phase of rotation of said rotary head;
   noise detector means for receiving a signal reproduced from said rotary head and the pulse signal generated by said pulse generating means, and for generating a control pulse when a noise part of said reproduced signal is not coincident with said pulse signal;
   means for discriminating the generation and non-generation of said control pulse and providing an output indicative thereof;
   means for low speed driving said magnetic tape through said driving means in accordance with said control pulse;
   frame feed means for intermittently driving said magnetic tape through said driving means; and
   means for outputting a signal indicative of the end of the frame feed, whereby after intermittently driving said magnetic tape by said frame feed means, said magnetic tape is driven at a low speed by said low speed driving means so as to repeat intermittent and low speed driving in accordance with the output of said discriminating means.

* * * * *